United States Patent [19]

Taylor

[11] Patent Number: 5,196,033
[45] Date of Patent: Mar. 23, 1993

[54] BIS-AZOTRIAZINYL REACTIVE DYES HAVING AN N-ALKYL-PHENYLENEDIAMINE LINK FOR CELLULOSE TEXTILES

[75] Inventor: John A. Taylor, Prestwich, United Kingdom

[73] Assignee: Imperial Chemical Industries plc, London, United Kingdom

[21] Appl. No.: 727,533

[22] Filed: Jul. 9, 1991

Related U.S. Application Data

[60] Division of Ser. No. 472,407, Feb. 1, 1990, Pat. No. 5,059,681, which is a continuation of Ser. No. 84,097, Aug. 11, 1987, abandoned.

[30] Foreign Application Priority Data

Aug. 15, 1986 [GB] United Kingdom ............... 8619914

[51] Int. Cl.$^5$ ............ C09B 62/04; C09B 67/24; D06P 1/38
[52] U.S. Cl. ............................................. 8/549; 8/543; 8/662; 8/676; 8/680; 8/684; 8/918; 534/634; 534/637
[58] Field of Search ............................................. 8/549

[56] References Cited

U.S. PATENT DOCUMENTS

| | | | |
|---|---|---|---|
| 3,646,002 | 2/1972 | Andrew et al. | 534/624 |
| 3,647,778 | 3/1972 | Andrew et al. | 534/634 |
| 3,926,944 | 12/1975 | Berrie et al. | 534/634 |
| 3,966,705 | 6/1976 | Oesterlein et al. | 534/634 |
| 4,584,367 | 4/1986 | Matsuo et al. | 534/634 |
| 4,670,547 | 6/1987 | Lehr | 534/637 |
| 4,785,081 | 11/1988 | Franke | 534/598 |
| 4,866,163 | 9/1989 | Koch | 534/634 |
| 5,059,681 | 10/1991 | Taylor | 534/634 |

FOREIGN PATENT DOCUMENTS

| | | |
|---|---|---|
| 34287 | 8/1981 | European Pat. Off. |
| 0145655 | 6/1985 | European Pat. Off. ............ 534/634 |
| 2611550 | 9/1976 | Fed. Rep. of Germany ...... 534/634 |
| 148784 | 6/1981 | German Democratic Rep. . |
| 148785 | 6/1981 | German Democratic Rep. . |
| 0152354 | 11/1981 | German Democratic Rep. ............ 534/634 |
| 53-60935 | 5/1978 | Japan ............... 534/634 |
| 60-215882 | 10/1985 | Japan . |
| 599316 | 5/1978 | Switzerland . |
| 621358 | 1/1981 | Switzerland ............ 534/634 |
| 466263 | 4/1975 | U.S.S.R. ............ 534/634 |
| 854432 | 11/1960 | United Kingdom ............ 534/634 |
| 1015931 | 1/1966 | United Kingdom . |
| 1017271 | 1/1966 | United Kingdom . |
| 1019771 | 2/1966 | United Kingdom . |
| 1283771 | 8/1972 | United Kingdom . |
| 1461125 | 1/1977 | United Kingdom ............ 534/634 |
| 2065159 | 6/1981 | United Kingdom . |
| 2111538 | 7/1983 | United Kingdom ............ 534/634 |

Primary Examiner—A. Lionel Clingman
Attorney, Agent, or Firm—Cushman, Darby & Cushman

[57] ABSTRACT

A water-soluble reactive dye of the formula:

$$D^1-Z^1-NR^1-T-NR^2-Z^2-D^2 \quad (1)$$

wherein
each of $D^1$ and $D^2$, independently, represents the radical of a water-soluble chromophoric compound,
each of $Z^1$ and $Z^2$, independently, represents a triazine or pyrimidine residue carrying an atom or group imparting fibre-reactivity to the dye,
$R^1$ represents an optionally substituted alkyl radical,
$R^2$ represents hydrogen or an optionally substituted alkyl radical, and
T represents a 1,3- or 1,4-phenylene radical which may carry one or more substituents selected from halogen, alkyl, alkoxy, acylamino, nitro and carboxy.

13 Claims, No Drawings

BIS-AZOTRIAZINYL REACTIVE DYES HAVING AN N-ALKYL-PHENYLENEDIAMINE LINK FOR CELLULOSE TEXTILES

This is a division of application Ser. No. 07/472,407, filed Feb. 1, 1990, now U.S. Pat. No. 5,059,681 which is a continuation of application Ser. No. 07/084,097, filed Aug. 11, 1987 and abandoned.

This invention relates to reactive dyes, to their preparation and to their application to textile substrates.

According to the invention, there are provided water-soluble reactive dyes of the formula:

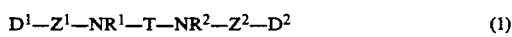

$$D^1\text{—}Z^1\text{—}NR^1\text{—}T\text{—}NR^2\text{—}Z^2\text{—}D^2 \quad (1)$$

wherein
- each of $D^1$ and $D^2$, independently, represents the radical of a water-soluble chromphoric compound,
- each of $Z^1$ and $Z^2$, independently, represents a triazine or pyrimidine residue carrying an atom or group imparting fibre-reactivity to the dye,
- $R^1$ represents an optionally substituted alkyl radical,
- $R^2$ represents hydrogen or an optionally substituted alkyl radical, and
- T represents a 1,3- or 1,4-phenylene radical which may carry one or more substituents selected from halogen, alkyl, alkoxy, acylamino, nitro and carboxy.

The radicals represented by $D^1$ and $D^2$, which may be the same or different, are radicals of water-soluble organic dyes. Typical radicals represented by $D^1$ and $D^2$ respectively are of the form $D^3NR^3$— and $D^4NR^4$— being derived from water-soluble dyes $D^3NR^3H$ and $D^4NR^4H$ wherein each of $R^3$ and $R^4$, independently, represents hydrogen or an an optionally substituted alkyl radical and each of $D^3$ and $D^4$, independently, represents a radical of the azo for example monoazo, disazo and metallised azo, anthraquinone, phthalocyanine, formazan or triphenodioxazine series, carrying one or more water-solubilising groups, for example sulphonic acid groups.

It is preferred that each of $D^1$ and $D^2$ represents a sulphonated monoazo radical, for example a radical of the formula:

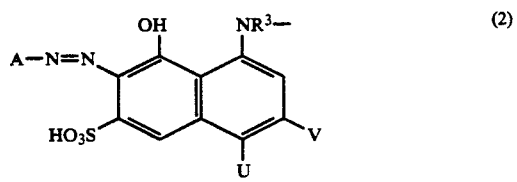

wherein A represents a radical of the benzene or naphthalene series and one of U and V is —SO$_3$H, the other being H. Particularly useful dyes are obtained when A is a sulphonated phenyl or naphthyl radical, especially a radical containing a sulpho group in ortho position to the azo link. Thus, valuable structures represented by A include:

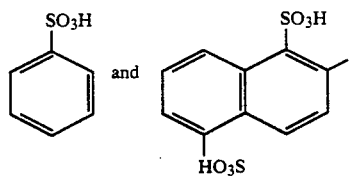

Each of the triazine or pyrimidine residues represented by $Z^1$ and $Z^2$ carries a substituent which makes the dyes of the invention fibre-reactive, that is to say capable of reacting, under suitable conditions, with the hydroxyl groups present in cellulosic fibres or with the amino groups present in natural and synthetic polyamide fibres to form a covalent linkage between the dye and the fibrous substrate. Substituents capable of imparting the required fibre-reactivity are well known in the art.

Thus, $Z^1$ and $Z^2$ may represent triazine radicals of the formula:

wherein X represents Cl, Br, F, SO$_3$H or a quaternary ammonium group. Other radicals which may be represented by $Z^1$ and $Z^2$ include fluorochloropyrimidine and methanesulphonylchloropyrimidine radicals. Preferably, both of $Z^1$ and $Z^2$ are monochlorotriazine radicals.

Optionally substituted alkyl radicals which may be represented by $R^1$, $R^2$, $R^3$ and $R^4$ include $C_{1-8}$, preferably $C_{1-4}$, alkyl radicals which may carry substituents selected from halogen, hydroxy, cyano, carboxy, carbamoyl, alkoxy, acyl, acyloxy, alkoxycarbonyl and optionally substituted phenyl.

Those dyes of the invention in which $Z^1$ and $Z^2$ carry labile chlorine, bromine or fluorine atoms may be prepared by reacting a 1,3- or 1,4- phenylene diamine of the formula:

wherein $R^1$ and $R^2$ are as defined above and the aromatic ring may be substituted by halogen, alkyl, alkoxy, acylamino, nitro or carboxy, with one mole of a triazine or pyrimidine compound of the formula:

$$D^1\text{—}Z^1\text{—}X^1 \quad (5)$$

and one mole of a triazine or pyrimidine compound of the formula:

$$D^2\text{—}Z^2\text{—}X^2 \quad (6)$$

wherein $D^1$ and $D^2$ are as defined above; $Z^1$ and $Z^2$ are as defined above but carrying only Cl, Br or F atoms and each of $X^1$ and $X^2$ is Cl, Br or F.

This process can conveniently be carried out by stirring the reactants in an aqueous medium, optionally in the presence of a water-soluble organic solvent, at a temperature of from 20°-60° C., and preferably maintaining the pH at from 5-8 by adding an acid-binding agent to neutralize the hydrogen halide formed during the reaction. Suitable acid-binding agents are alkali metal hydroxides, carbonates and bicarbonates.

As examples of diamines of Formula (4) there may be mentioned the N-methyl, N-ethyl, N-benzyl, N,N'-dimethyl and N,N'-diethyl derivatives of 1,3- and 1,4-phenylene diamines.

Compounds of Formula (5) and Formula (6) may be obtained, for example, by reacting cyanuric chloride or an appropriate pyrimidine at 0°-20° C. in an aqueous medium, with water soluble dyestuff compounds of the formulae $D^1H$ and $D^2H$, especially $D^3NR^3H$ and $D^4NR^4H$ which are defined above. Such dyestuff compounds have been fully described in the prior art and especially include monoazo dyes of the formula:

(7)

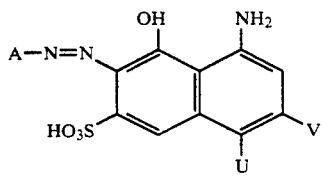

wherein A, U and V are as defined above.

Dyes of the invention in which $Z^1$ and $Z^2$ carry labile chlorine, bromine or fluorine atoms may also be prepared by reacting a diamine of Formula (4) with two moles of cyanuric halide or an appropriate pyrimidine followed by the dyestuff compounds $D^1H$ and $D^2H$.

Dyes of the invention containing residues of Formula (3) in which X is a sulpho or quaternary ammonium group may be obtained by reacting dyes in which X is Cl, Br or F with an alkali metal hydrogen sulphite or an appropriate tertiary amine or pyridine compound. Such a reaction is normally carried out in aqueous medium at 30° to 100° C.

The reactions leading to the formation of the dyes of the invention may be performed using conditions that have been fully described in the prior art for such reactions. Similarly, the dyes may be isolated by known methods, for example spray drying or precipitation and filtration. As in the case of other dyes containing sulphonic acid groups, it is often convenient to isolate and use the dyes in the form of their water-soluble salts, particularly their alkali metal (especially sodium) or ammonium salts. It is to be understood that the invention relates to both the free acids and their salts.

The dyes of the present invention may be used for colouring a wide range of textile materials containing hydroxyl or amino groups, for example wool, silk, synthetic polyamides and natural or regenerated cellulose, for example cotton or viscose rayon materials, by conventional methods used for colouring such materials with water-soluble reactive dyes. Thus, in the case of cellulose they are preferably applied in conjunction with a treatment with an acid binding agent such as caustic soda, sodium carbonate, phosphate, silicate or bicarbonate, which may be applied to the cellulose textile materials before, during or after the application of the dyestuff.

The dyes of the present invention are valuable reactive dyes for cellulose. They yield coloured textiles with good resistance to washing and light. They are particularly characterised by having superior wash-off properties relative to the corresponding known dyes in which both of $R^1$ and $R^2$ are hydrogen. Furthermore, the dyes of the invention possess superior fixation efficiency compared with the dyes of GB 2065159A which contains a 1,2-phenylene radical in place of the 1,3- or 1,4-phenylene radicals represented by T in Formula (1) above.

A particularly useful dye of the invention has the formula:

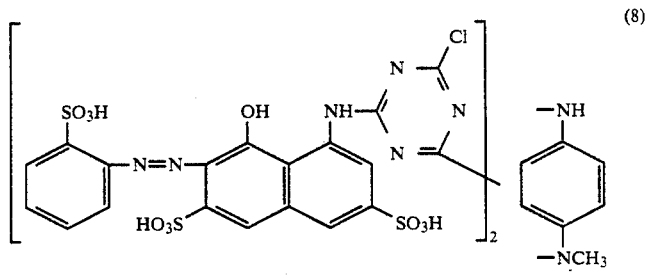

(8)

The dyes of the invention may be used in admixture with other reactive dyes. Attractive royal blue shades can be obtained by using the dye of Formula (8) in admixture with the dye of the formula:

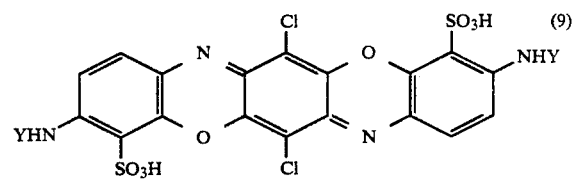

(9)

where Y is

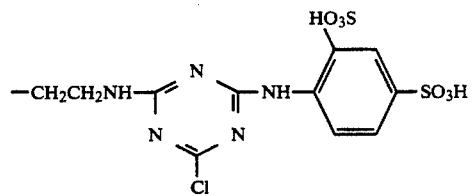

the weight ratio of the dye of Formula (9) to the dye of Formula (8) being in the range 80:20 to 98:2. The dye of Formula (9) is described in our GB 1450746.

The invention is illustrated but not limited by the following Examples in which all parts and percentages are by weight.

EXAMPLE 1

A solution of 1-hydroxy-2-(o-sulphophenylazo)-8-(3',5'-dichloro-s-triazinylamino)-naphthalene-3,6-disulphonic acid (49.25 parts, 72% strength) and N-methyl-p-phenylene diamine (3.52 parts) in water (800 parts) was stirred at 20° C. and pH 6.5 for 16 hours. Salt (80 parts) was added with stirring and the resultant precipitated dye was collected and dried. Yield 58.6 parts (61% strength). The product gives a red shade when applied to cellulosic fibres.

EXAMPLE 2

A solution of 1-hydroxy-2-(1',5'-disulphonaphth-2'-ylazo)-8-(3'',5''-dichloro-s-triazinylamino)naphthalene-3,6-disulphonic acid (80.7 parts, 47% strength) and N-methyl-p-phenylene diamine (3.1 parts) in water (650 parts) was stirred at pH 6.5 and 20° C. for 2 hours. Acetone (3000 parts) was added slowly with stirring and the paste solid collected. Yield 61.3 parts (47% strength).

The following Table gives further Examples of dyes of the invention, the dyes being identified in accordance with the notation of Formula (1).

| Example | $D^1H$ | $Z^1$ | $R^1$ | T | $R^2$ | $D^2$ | $Z^2$ |
|---|---|---|---|---|---|---|---|
| 3 | 3-ureido-4-(3',6',8'-trisulphonaphth-2'-ylazo)aniline | 2-chloro-triazin-4,6-diyl | $CH_3$ | p-phenylene | H | $D^1$ | $Z^1$ |
| 4 | 1-hydroxy-2-(1',5'-disulphonaphth-2'-ylazo)-6-methylaminonaphthalene-3-sulphonic acid | 2-chloro-triazin-4,6-diyl | " | " | " | " | " |
| 5 | 1-hydroxy-2-(1'-5'-disulphonaphth-2'ylazo)-6-aminonaphthalene-3-sulphonic acid | 2-chloro-triazin-4,6-diyl | " | " | " | " | " |

EXAMPLE 6

N,N'-Dimethyl-p-phenylenediamine (5.22 parts) in water (50 parts) was added to a stirred solution of 1-hydroxy-2-(2'-sulpho-phenylazo)-8-(3'', 5''-dichloro-s-triazinylamino)naphthalene-3,6-disulphonic acid (62.25 parts, 50% strength) in water (700 parts) at pH 6.5 and 20° C. After 30 minutes salt (105 parts) was added, with stirring, and the resultant precipitated dye was collected and dried.

Yield 51.3 parts (59% strength).

EXAMPLE 7

A mixture of 1-hydroxy-2-(2'-sulpho-4'-methoxyphenylazo)-6-(2'',4''-dichloro-s-triazinylamino)naphthalene-3-sulphonic acid (31.5 parts, 32% strength) and N-methyl-p-phenylenediamine dihydrochloride (1.82 parts) in water (1000 parts) was stirred at 30° to 35° C. and pH 6.5 for 20 hours. Methylated spirits (74 OP, 500 parts) was added with stirring and the resulting precipitate was collected and dried.

Yield 15.3 parts, 72% strength.

EXAMPLE 8

A solution of 1-hydroxy-2-(2'-sulphophenylazo)-8-(2'',4''-dichloro-s-triazinylamino)naphthalene-3,5-disulphonic acid (29.8 parts, 44% strength) and N-methyl-p-phenylenediamine (1.22 parts) in water (1000 parts) was stirred at 20° C. and pH 6.5 for 1 hour. Sodium chloride (150 parts) and potassium chloride (50 parts) were added and the resulting precipitate was collected and dried.

Yield 22 parts, 61% strength.

EXAMPLE 9

A solution of 1-hydroxy-2-(2'-methyl-4'-sulphophenylazo)-8-(2'',4''-dichlorotriazinylamino)naphthalene-3,6-disulphonic acid (26.56 parts at 100% strength) and N-methyl-p-phenylenediamine dihydrochloride (3.64 parts) in water (800 parts) was stirred at pH 6.5 and 35° C. for 2 hours. On cooling to 20° C., salt (200 parts) was added and the precipitated solid was collected and dried.

Yield 36.0 parts, 52% strength.

EXAMPLE 10

N-methyl-p-phenylenediamine dihydrochloride (2.32 parts) was added at 10° to 15° C. and pH 6.5 to a stirred solution of 1-hydroxy-2-(2'-sulpho-4'-methylphenylazo)-8-(2'',4''-dichloro-triazinylamino)naphthalene-3,6-disulphonic acid (26.73 parts at 61% strength) in water (450 parts). After 10 minutes, salt (30 parts) was added, precipitated product was collected and dried.

Yield 23.7 parts at 70% strength.

| Example | $D^1H$ | $Z^1$ | $R^1$ | T | $R^2$ | $D^2$ | $Z^2$ |
|---|---|---|---|---|---|---|---|
| 11 | 2-Amino-3-sulpho-4-(3'-amino-4'-sulpho-phenylamino)-anthraquinone | 2-chloro-triazin-4,6-diyl | $CH_3$ | 1,4-phenylene | H | $D^1$ | $Z^1$ |
| 12 | 2-(3',6',8'-trisulphonapth-2-yl-azo)-4-methoxy-5-amino-acetanilide | 2-chloro-triazin-4,6-diyl | " | " | $CH_3$ | " | " |
| 13 | 1-Hydroxy-2-(2'-sulphophenylazo)-6-aminonaphthalene-3-sulphonic acid | 2-chloro-triazin-4,6-diyl | " | 1,3-phenylene | H | " | " |

-continued

| Example | D¹H | Z¹ | R¹ | T | R² | D² | Z² |
|---|---|---|---|---|---|---|---|
| 14 | 1-Amino-2-(2',5'-di-sulphophenylazo)-7-(2''-sulpho-5''-aminophenylazo)-8-hydroxy naphthalene-3,6-disulphonic acid | 2-chloro-triazin-4,6-diyl | " | " | " | " | " |
| 15 | 1-(4'-sulphophenyl)-3-carboxy-4-(2''-sulpho-5''-aminophenylazo)-pyrazol-5-one | 2-chloro-triazin-4,6-diyl | HOC₂H₄ | 1,4-phenylene | " | " | " |
| 16 | 4-Nitro-4'-(4''-methylaminophenyl-azo)-stilbene-2,2'-disulphonic acid | 2-chloro-triazin-4,6-diyl | C₂H₅ | " | " | " | " |
| 17 | 1-Ethyl-2-hydroxy-3-carbonamido-4-methyl-5-(2',4'-disulpho-6'-amino-phenylazo)pyrid-6-one | 2-chloro-triazin-4,6-diyl | CH₃ | 1,3-phenylene | " | " | " |
| 18 | 2,4,6-Trihydroxy-5-(2',5'-disulpho-4'-aminophenylazo) pyrimidine | 2-chloro-triazin-4,6-diyl | " | 1,4-phenylene | " | " | " |
| 19 | 2-(2',4'-diamino-5'-sulphophenylazo)-naphthalene-4,6,8-trisulphonic acid | 2-chloro-triazin-4,6-diyl | " | " | CH₃ | " | " |
| 20 | 1:1-Copper complex of 1-hydroxy-2-(1'-hydroxy-4',8'-disulphonaphth-2-ylazo)-8-amino-naphthalene-3,6-disulphonic acid | 2-chloro-triazin-4,6-diyl | 3-sulpho benzyl | " | H | " | " |
| 21 | 1:2-Chromium complex of 1-hydroxy-2-(2'-hydroxy-5'-nitrophenylazo)-8-aminonaphthalene-3,6-di-sulphonic acid | 5-chloro-6-fluoro pyrimidin-2,4-diyl | CH₃ | " | " | " | " |
| 22 | 1-Hydroxy-2-(2',5'-disulphophenylazo)-7-aminonaphthalene-3-sulphonic acid. | 2-chloro-triazin-4,6-diyl | 3-hydroxy propyl | " | " | " | " |

EXAMPLE 23

A dyeing vessel was filled with water (liquor ratio 20:1) at 30° C. and salt (80 g/l) was added. The machine was run for 15 minutes to allow the salt to dissolve and dye [a 95/5 mixture of the dyes of Formula (9) and Formula (8)] was added as a concentrated solution over 5 minutes to give a concentration of 5% on the weight of fabric. After allowing 10 minutes for the dye to distribute evenly, the temperature was raised to 85° C. over 20 minutes. After running for a further 20 minutes, soda ash (20 g/l) was added as a slurry over 10 minutes and fixation was allowed to proceed for 60 minutes.

After discharging the dye liquor, the fabric was rinsed thoroughly and soaped at the boil for 20 minutes. The fabric was rinsed and dried to give a uniform level dyeing with good fastness properties.

I claim:

1. A process for coloring a cellulosic textile material which comprises applying thereto a water-soluble reactive dye of the formula:

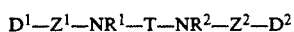

wherein each of $D^1$ and $D^2$, independently, represents the radical of a water-soluble azo compound, each of $Z^1$ and $Z^2$, independently, represents a triazine or pyrimidine residue carrying a Cl, Br, F, SO₃H or quaternary ammonium group, $R^1$ represents a $C_{1-8}$-alkyl radical which is unsubstituted or substituted by a halogen, hydroxy, cyano, carboxy or carbamoyl group, $R^2$ represents hydrogen or a $C_{1-8}$-alkyl radical which is unsubstituted or substituted by a halogen, hydroxy, cyano, carboxy or carbamoyl group, and T represents a 1,3- or 1,4-phenylene radical which may carry one or more substituents selected from halogen, alkyl, alkoxy, acylamino, nitro and carboxy.

2. A process for colouring a cellulosic textile material which comprises applying thereto a reactive dye according to claim 1 wherein $D^1$ and $D^2$ respectively are radicals of the form $D^3NR^3$— and $D^4NR^4$— in which each of $D^3$ and $D^4$, independently, represents a radical of the azo, series carrying one or more sulphonic acid groups and each of $R^3$ and $R^4$, independently, represents hydrogen or a $C_{1-8}$-alkyl radical which is unsubstituted or substituted by a halogen. hydroxy. cyano. carboxy or carbamoyl group.

3. A process for coloring a cellulosic textile material which comprises applying thereto a reactive dye according to claim 1 wherein each of $D^1$ and $D^2$ is a sulphonated monoazo radical.

4. A process for coloring a cellulosic textile material which comprises applying thereto a reactive dye according to claim 1 wherein each of $D^1$ and $D^2$ is a radical of the formula:

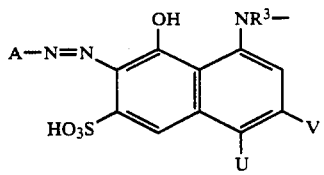

wherein $R^3$ is H or a $C_{1-8}$-alkyl radical which is unsubstituted or substituted by a halogen, hydroxy, cyano, carboxy or carbamoyl group. A represents a radical of the benzene or naphthalene series and one of U and V is $-SO_3H$, the other being H.

5. A process for coloring a cellulosic textile material which comprises applying thereto a reactive dye according to claim 4 wherein A is a sulphonated phenyl or naphthyl radical having a sulpho group in an ortho position relative to the azo group.

6. A process for coloring a cellulosic textile material which comprises applying thereto a reactive dye according to claim 1 wherein each of $Z^1$ and $Z^2$ is a monochlorotriazine radical.

7. A process for coloring a cellulosic textile material which comprises applying thereto a reactive dye which, in the free acid form, has the formula:

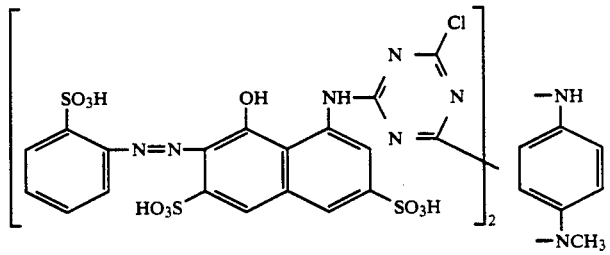

8. A process according to claim 1 wherein the dye is applied to a cellulosic material in conjunction with an acid binding agent.

9. A process according to claim 1 wherein the textile material contains hydroxyl groups.

10. A process according to claim 1 wherein the textile material is natural or regenerated cellulose.

11. A process according to claim 7 wherein the dye is applied to a cellulosic material in conjunction with an acid binding agent.

12. A process according to claim 7 wherein the textile material contains hydroxyl groups.

13. A process according to claim 7 wherein the textile material is natural or regenerated cellulose.

* * * * *